United States Patent [19]

Kawaguchi et al.

[11] Patent Number: 5,557,554
[45] Date of Patent: Sep. 17, 1996

[54] CALIBRATION METHOD FOR PROTRUSION DETECTING HEAD UNITS AND PROTRUSION INSPECTION METHOD AND PROTRUSION INSPECTION DEVICE USING THE SAME

[75] Inventors: Hiroshi Kawaguchi, Odawara; Takashi Nakakita, Hadano; Shinji Homma, Kanagawa-ken, all of Japan

[73] Assignee: Hitachi Electronics Engineering Co., Ltd., Tokyo, Japan

[21] Appl. No.: 222,948

[22] Filed: Apr. 5, 1994

[30] Foreign Application Priority Data

Apr. 8, 1993 [JP] Japan ................................. 5-106233

[51] Int. Cl.$^6$ .................................................. G01B 21/08
[52] U.S. Cl. ........................ 364/571.01; 364/571.02
[58] Field of Search ........................ 364/571.01, 571.02

*Primary Examiner*—Edward R. Cosimano
*Attorney, Agent, or Firm*—Fay, Sharpe, Beall, Fagan, Minnich & McKee

[57] ABSTRACT

A calibration method for protrusion detection head units including steps of selecting as a master head unit a protrusion detection head unit of which lifting characteristic is known, further selecting one of any protrusion detection head units which is used for protrusion inspection as a measurement head unit, determining a disk having a predetermined surface roughness as a reference disk, successively loading the head of the master head unit and the head of the measurement head unit on the face of the reference disk which is rotated and causing to lift the same, measuring output voltages em of the master head unit and output voltages es of the measurement head unit while varying the circumferential speed of the track on the reference disk to determine as a function respective output voltage characteristics using the circumferential speed and linear-approximating the respective output voltage characteristics on a rectangular coordinate system of output voltage-circumferential speed to determine linear equations of $em=-av+b$ and $es=-a'v+b'$, wherein $a$ and $a'$ are inclinations and $b$ and $b'$ are intercepts on the output voltage axis of the linear equations.

13 Claims, 7 Drawing Sheets

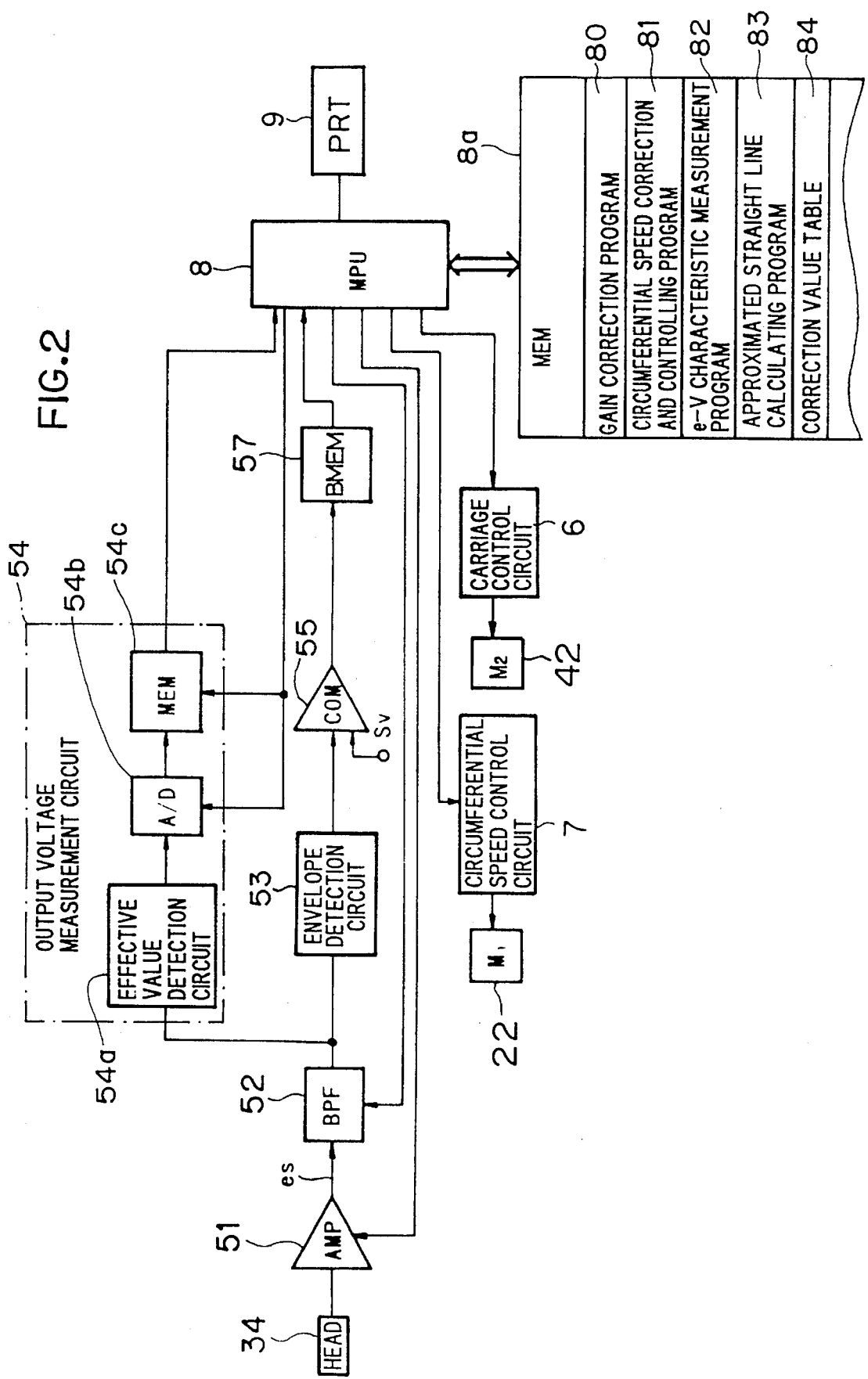

FIG.3(a)
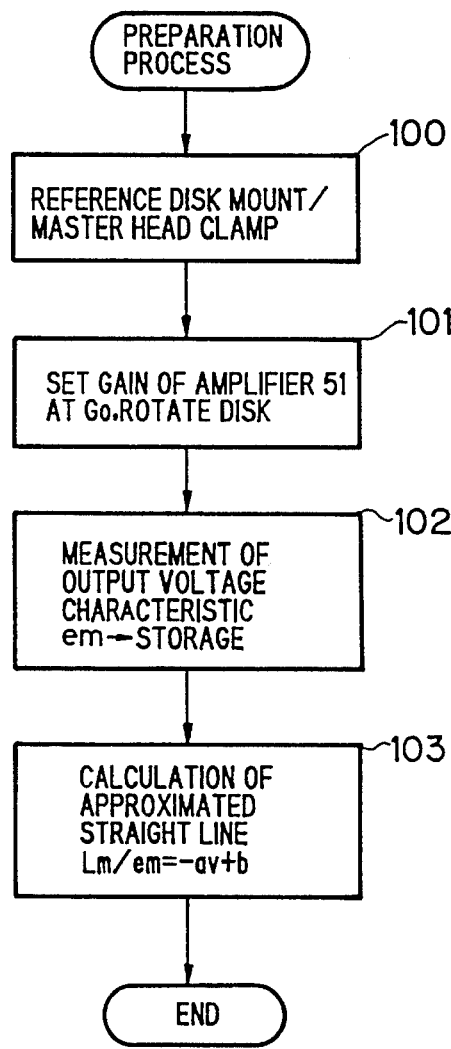
FIG.3(b)
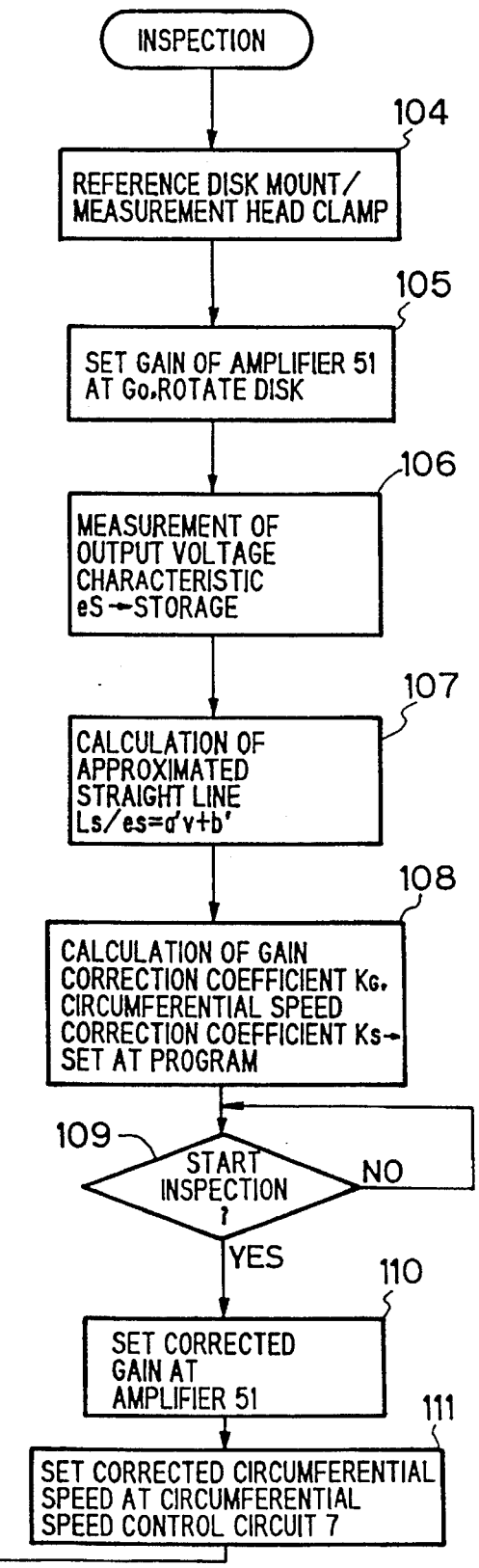
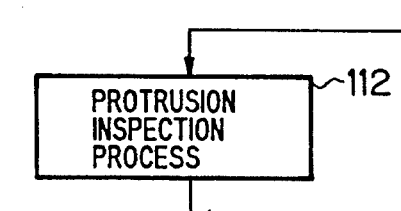

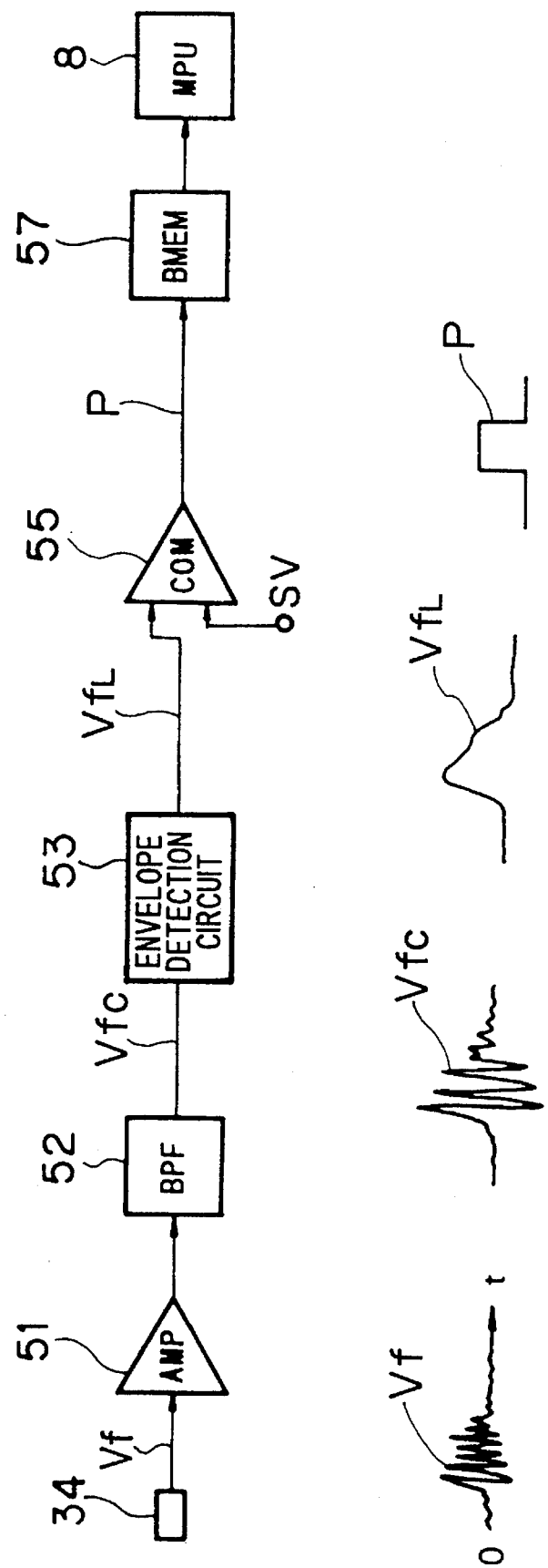

ns: 5,557,554

CALIBRATION METHOD FOR PROTRUSION DETECTING HEAD UNITS AND PROTRUSION INSPECTION METHOD AND PROTRUSION INSPECTION DEVICE USING THE SAME

BACKGROUND OF THE INVENTION

1. Field of the Invention

The present invention relates to a calibration method for protrusion detecting head units in a protrusion inspection device used for magnetic disks which can determine a highly reliable measurement data even if there is dispersion in detection characteristics of the protrusion detecting head units. The present invention also relates to a protrusion inspection method and a protrusion inspection device using the same.

2. Conventional Art

Magnetic disks (hereinafter simply called disk or disks) which constitute one of information recording media are manufactured while using aluminium or glass disks as the base and applying a magnetic film on the respective surfaces thereof. The magnetic film surface is required to be formed into a smooth and flat surface with no unevennesses such as protrusions. For this purpose, the magnetic film surface is polished. However, even after polishing protrusions may remain. When there are more than a predetermined number of protrusions having a height more than a predetermined one, these protrusions collide with a magnetic head and damage the same, and further are likely to cause errors in data to be accessed. In order to prevent these dangers, protrusion inspection for magnetic disks is performed with a protrusion inspection device. If the result of the inspection revealed that more than the predetermined number of protrusions having a height more than the predetermined one still remain, the magnetic disk was polished again.

For the protrusion detecting head unit (hereinafter simply called as head unit) in a protrusion inspection device a piezo-electric element using quartz was used for the first time. However the detection sensitivity and the saturation characteristic of the piezo-electric element are unsatisfactory, and further miniaturization thereof was difficult. Therefore an ultrasonic piezo-electric sensor (hereinafter simply called as ultrasonic sensor) having excellent detection sensitivity and saturation charactristic has drawn increased attention. The inventor of the present application produced a head unit using such an ultrasonic sensor for which a U.S. patent application was filed having U.S. Ser. No. 07/977,634 which is abandoned and now Ser. No. 08/350,034, now U.S. Pat. No. 5,488,857, and entitled "PROTRUSION SENSOR FOR SENSING PROTRUSION ON A DISC".

FIG. 4 shows a schematic view of such head unit in connection with the above U.S. patent application. Numeral 3 designates the head unit which is constituted by a slider 31 functioning as a thin film head, a suspension spring 32 fixedly securing the slider at the top end thereof, a supporting arm 33 supporting the suspension spring while clamping the same at the bottom end thereof and an ultrasonic sensor 34 fixedly secured at a proper portion on the supporting arm 33. The ultrasonic sensor 34 is made of polycrystalline ceramics of barium titanate or lead zirconate titanate and has a specific vibration frequency which is determined depending on the thickness and size thereof.

During a protrusion inspection, when the head of the head unit 3 is loaded with respect to a track TR of the rotating disk 1, the slider 31 is lifted through air flow by a predetermined lifting amount δH. When the slider 31 collides with a protrusion existing on the track TR, the slider is caused to vibrate. The vibration is transmitted to the supporting arm 33 via the suspension spring 32. As a result, the ultrasonic sensor 34 is vibrated at its specific vibration frequency, generates a voltage signal (a collision detection signal) and outputs the same.

FIG. 5 shows a constitutional diagram of the protrusion inspection device. A disk 1 for the inspection object is mounted on a spindle 21 of a rotary mechanism 2 and is driven to rotate by a motor (M1) 22. Head units 3A and 3B are respectively provided with respect to both faces, i. e. the front face (upper side) and the back face (lower side) of the disk 1 (in the embodiment of the above mentioned prior application the head unit 3B is not provided of which difference is explained later) and the respective supporting arms 33, 33 for these head units are clamped at a carriage mechanism 41 of a carriage portion 4. When a motor (M2) 42 is rotated, the slider 31 moves toward the radial direction of the disk 1 and scans the disk 1 while either sequentially stopping at every track TR or continuously moving in a spiral manner. Usually, a carriage control program and a circumferential speed control program are stored in a memory (MEM) 8a in order to keep the lifting amounts δH of the respective sliders 31 constant with respect to the entire tracks TR and an MPU 8 executes both programs to operate a carriage control circuit 6 and a circumferential speed control circuit 7. As a result, the motor M2 is rotated by the former and the motor M1 by the latter and the circumferential speed of the respective tracks TR on the disk 1 is kept constant with respect to slider 31, which performs scanning while either sequentially stopping or moving in spiral manner, to perform the protrusion inspection.

Collision detection signals outputted from the respective ultrasonic sensors 34, 34 when the respective head units 3A and 3B collide with protrusions are respectively inputted to a protrusion detection circuit 5 wherein the level of the input is compared with a predetermined threshold level to perform the protrusion detection. The resultant protrusion detection signal P (see FIG. 6(e)) is processed in the MPU 8 and is stored in the memory (MEM) 8a for the management as data relating to such as collision position and collision number. Then after the measurement, this data is outputted from a printer (PRT) 9 as measured data of protrusions.

FIG. 6(a) is a constitution diagram of the protrusion detection circuit 5. The collision detection signal Vf (see FIG. 6(b)) outputted from the ultrasonic sensor 34 or the piezo-electric element is amplified by an amplifier 51 and unnecessary components therein are removed by a band-pass filter (BPF) 52 to produce a waveform signal Vfc (see FIG. 6(c)). The waveform signal Vfc is subjected to an envelope detection to produce another waveform signal VfL (see FIG. 6(d)). Subsequently the waveform signal VfL is compared at a comparator 55 with a proper slice voltage Sv to convert it into a digital signal to determine the protrusion detection signal P as shown in FIG. 6(e). The protrusion detection signal P is stored at a predetermined position in a buffer memory (BMEM) 57 depending upon its generation timing, and the signal is processed in the MPU 8 at a good time after either reading out the stored data or being transmitted.

Now, the slider 31, the suspension spring 32 and the supporting arm 33, which constitute the head unit 3, have respective specific vibration frequencies depending on criteria such as their weights and elastic characteristics, however these values disperse and their vibrations suffer from irregularity. The ultrasonic sensor 34 itself also shows a deviation with respect to the original specific vibration frequency due to its thickness dispersion. For these reasons, the lifting characteristics of head units with respect to a circumferential speed at a certain track and the output voltages in collision detection signals Vf generated by a collision vary from head unit to head unit, and dispersion of their output voltage characteristics results.

On one hand, in the course of the protrusion detection operation, breaking down and characteristic deterioration of such as the slider 21 and the ultrasonic sensor 34 are often caused due to the collision of the head unit 3 due to protrusions. When such elements deteriorate or break down, the entire head unit 3 is replaced. However, since the replaced head unit contains dispersion in its output voltage characteristic, the replaced head unit will show a detection irregularity. Thus the replaced head unit may or may not detect a protrusion having an identical size of which the head unit before the replacement could detect, thereby reliability of the protrusion inspection operation is lowered.

In particular, in the magnetic disk memory devices which are tending toward development of a high density memory, the result of the protrusion inspection closely relates to reliability of the devices. Therefore the ability to detect a protrusion having a more lower height with a high reliability is required.

Unlike the embodiment disclosed in the U.S. Ser. No. 07/977,634 which is abandoned and now Ser. No. 08/350, 034 now U.S. Pat. No. 5,488,857, an example has been explained in which another head unit (the head unit 3B) is provided also at the back face side. In such case where the head units are provided at both front and back face sides it is indispensable to equalize the characteristics of these heads for increasing the inspection reliability in the simultaneous inspection of the front and back face sides. If the characteristics of the head units for the front and back face sides are not equalized, the front and back face sides have to be inspected separately with a same head unit, thereby the disk once loaded has to be unloaded and loaded after turning it over which reduces the inspection efficiency.

SUMMARY OF THE INVENTION

An object of the present invention is to solve the above problems of the conventional art and to provide a calibration method for protrusion detecting head units which can calibrate efficiently the dispersion of output voltages of the protrusion head units in order to obtain a highly reliable inspection data.

Another object of the present invention is to provide a calibration method for protrusion detecting head units which permits simultaneous inspection of both front and back face sides by providing protrusion detecting head units both at front and back face sides and enables obtaining of highly reliable inspection data with a high efficiency.

A further object of the present invention is to provide a protrusion inspection method and a protrusion inspection device which enable obtaining of highly reliable inspection data even if the protrusion head unit is replaced by making use of the above calibration method for the protrusion detecting head unit.

The features of the calibration method for protrusion detecting head units, the protrusion inspection method and the protrusion inspection device according to the present invention which achieves these objects comprise selecting as a master head unit a protrusion detecting head unit of which the lifting characteristic is known, further selecting one of any protrusion detecting head units which is used for protrusion inspection as a measurement head unit, determining a disk having a predetermined surface roughness as a reference disk, successively loading the head of the master head unit and the head of measurement head unit on the face of the reference disk which is rotated and causing to lift the same, measuring output voltages em of the master head unit and output voltages es of the measurement head unit while varying the circumferential speed of the track on the reference disk to determine as a function respective output voltage characteristics using the circumferential speed and linear-approximating the respective output voltage characteristics on a rectangular coordinate system of output voltage-circumferential speed to determine linear equations of em=−av+b and es=−a'v+b', wherein a and a' are inclinations and b and b' are intercepts on the output voltage axis of the linear equations, further determining values b/b' and a'b/ab' from the linear equations of em=−av+b and es=−a'v+b', correcting the gain of an amplifier with the value b/b' which amplifies the output signal of the measurement head unit when the measurement head unit is to be used for the protrusion inspection and further correcting the circumferential speed of the track on a disk of the inspection object which is rotated with the value a'b/ab'.

In order to explain the effectiveness of the corrections, the dispersion of head unit characteristics is explained with reference to FIGS. 7(a) and 7(b).

FIG. 7(a) illustrates characteristic curves of lifting amount δH of the slider 31 and of output voltage e (converted to the effective values) of the head unit 3 with respect to circumferential speed v (abscissa) of the track TR. The position of the dotted line corresponds to the detection position of a maximum protrusion on the disk having a predetermined roughness, the lifting amount at that instant is p and the circumferential speed of the track on which the slider 31 locates is vp.

Further, the characteristic of output voltage e–circumferential speed v is determined by measuring effective values of the output voltage of the head unit while spirally scanning from the outermost track to the innermost track of the reference disk having a predetermined surface roughness at a constant circumferential speed v, averaging the measured values to determined a voltage value for the constant circumferential speed and repeating the measurement while successively increasing or decreasing the above constant circumferential speed v. The measurement range of tracks is not necessarily limited to the range from the outermost track to the innermost track, but is permitted if such covers a predetermined range of tracks through which protrusions having a certain height can be detected.

Now, the lifting amount δH of the head rises depending upon increase of the circumferential speed v and at the point p where the lifting amount δH crosses across the maximum protrusion level the circumferential speed shows vp. Protrusions can be detected at circumferential speeds less than vp and thus an output voltage e is generated at the head unit. Depending upon decreases of the circumferential speed the output voltage rises substantially linearly, then reaches to a peak and thereafter upon further decrease of the circumferential speed the output voltage curve shows somewhat complex characteristic. On the other hand, protrusions can not be detected when the circumferential speed is more than vp, however noise components in the output voltage still remain. For protrusion inspection, circumferential speed more than vp is usually employed and further the inspection is performed at a lifting amount of the head of a head unit more than p. The level of the maximum protrusion represents a measurable limit value in the output voltage characteristic before the output voltage e shifting into a non-linear region in the course of the output voltage characteristic measurement.

FIG. 7(b) shows respective characteristic curves of lifting amounts δHq and δHr, and output voltages eq and er with respect to circumferential speed v of two head units Hq and Hr which were selected arbitrarily. Since the characteristics of the head units disperse, both head units Hq and Hr show different head lifting amounts δHq and δHr and different output voltages eq and er as illustrated. The lifting amount δHq of the head unit Hq reaches the maximum protrusion detection level at point q and the lifting amount δHr of the head unit Hr reaches the maximum protrusion detection level at point r. The circumferential speeds corresponding to the respective points q and r are vq and vr which also differ from each other.

Now, in order to correctly inspect a protrusion having a predetermined height, it is necessary to provide a predetermined reference value and calibrate the dispersion of the output voltages of the respective head units as mentioned above so as to settle into the predetermined reference value. In the calibration manner according to the present invention, a characteristic portion on the characteristic curves eq and er of the output voltages shifting from a crest to a trough and showing substantially linear shape is noted, and when the characteristic portions are overlapped each other the maximum protrusion detection points q and r settle at substantially the same position or near-by positions, thereby the respective head units can be used as having substantially the same characteristics Accordingly, after loading and rotating a reference disk having a reference surface roughness onto a protrusion inspection device, track circumferential speed v versus characteristic of output voltage e of the master head unit, of which lifting characteristic is known, and a certain measurement head unit are measured with respect to the reference disk.

Subsequently the linearly inclined portions of the output voltage e–circumferential speed v in the output voltage characteristics of both head units are linear-approximated on e-v rectangular coordinate system. Then the equations of the respective straight lines are determined as em=−av+b and es=−a'v+b' and based on both approximated linear equations gain correction value KG=b/b' and circumferential speed correction value KS=a'b/ab' are calculated. By making use of these correction values one approximated straight line is corrected so as to coincide with the other approximated straight line. With this processing the characteristic portions of the respective output voltage characteristic curves shifting from the crest to the trough and showing substantially linear shape coincide with each other, and the positions of their maximum protrusion detection points settle into substantially a same position.

Through these corrections, the characteristic dispersion of the respective head units is canceled out and the respective output voltage characteristics are uniformalized for use in the protrusion inspection, therefore the reliability and the measurement efficiency of the protrusion inspection are improved. For example, the respective correction values KG and KS which were measured for a certain measurement head unit are set at a gain correction program and a circumferential speed correction and control program which were prepared beforehand in the protrusion inspection device and when performing a protrusion inspection with the measurement head unit, these programs are executed to correct the gain of an amplifier which amplifies the output voltage of the head unit with the correction value KG and further to correct the circumferential speed of the track on a disk for inspection with the correction value KS.

With these corrections, the output voltage characteristic es of this measurement head unit is calibrated to the output voltage characteristic em of the master head unit and the protrusion inspection is performed based on the output voltage characteristic em of the master head unit. Accordingly, it is easy to select two head units having a uniformalized circumferential speed for a protrusion inspection and by providing these head units at both front and back face sides of a disk respectively the simultaneous protrusion inspection at both front and back face sides can be performed. Further, when one of the head units is replaced with another head unit their characteristics are likely uniformalized, accordingly a highly reliable protrusion inspection is enabled.

BRIEF DESCRIPTION OF THE DRAWINGS

FIG. 2 is a block diagram of one embodiment of a protrusion inspection device to which the calibration method for head units according to the present invention is applied;

FIGS. 3(a) and 3(b) are diagrams for explaining a protrusion inspection sequence for the device as shown in FIG. 2, wherein FIG. 3(a) is a flowchart for sampling out an approximated straight line for a master head unit and FIG. 3(b) is a flowchart for the inspection;

FIG. 6(a) is a block diagram of a conventional protrusion inspection unit;

FIGS. 6(b) through 6(e) are waveform diagrams associated with the protrusion inspection unit of FIG. 6(a);

DESCRIPTION OF THE PREFERRED EMBODIMENT

Figure 1:
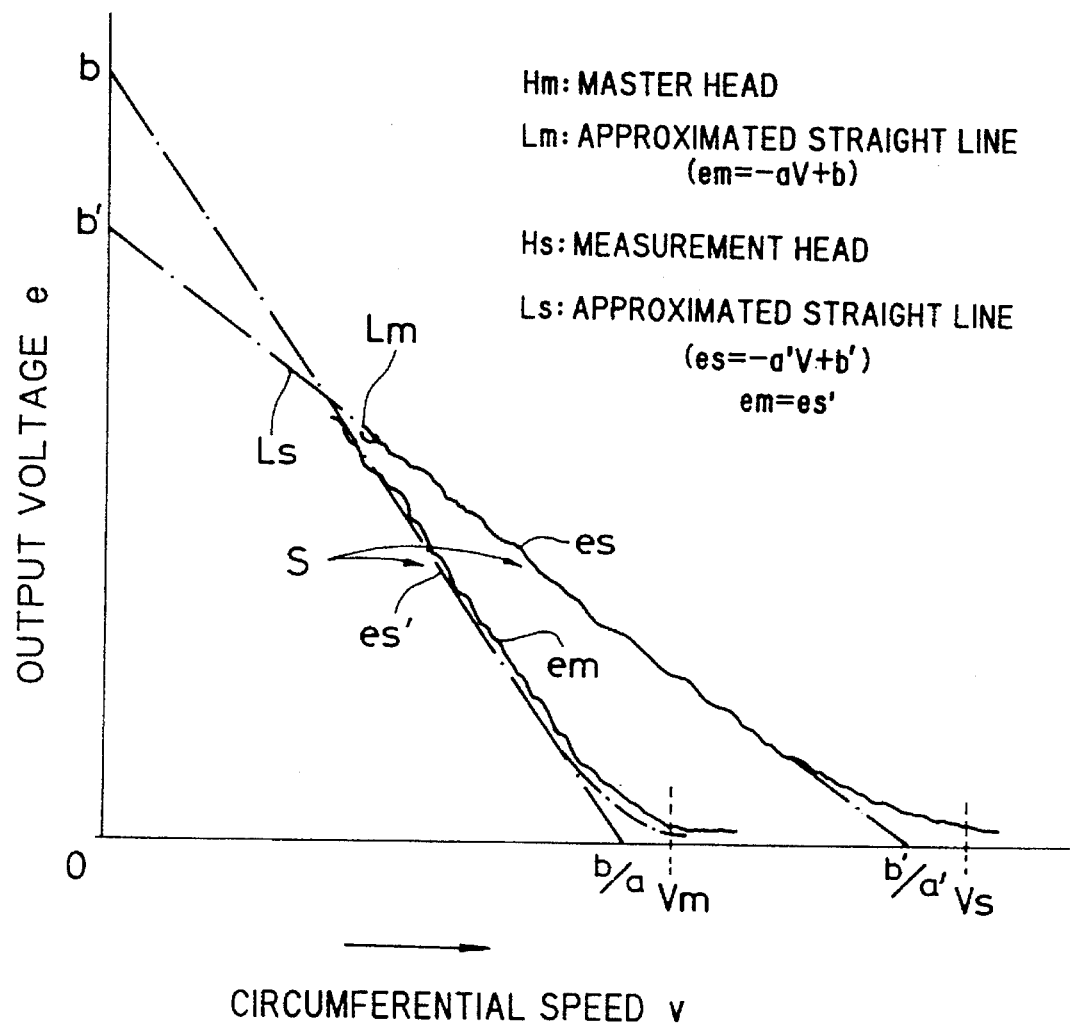
FIG. 1 shows characteristic diagrams of output voltages with respect to circumferential speed of head units for explaining the principle of the calibration method for head units according to the present invention.
Figure 4:
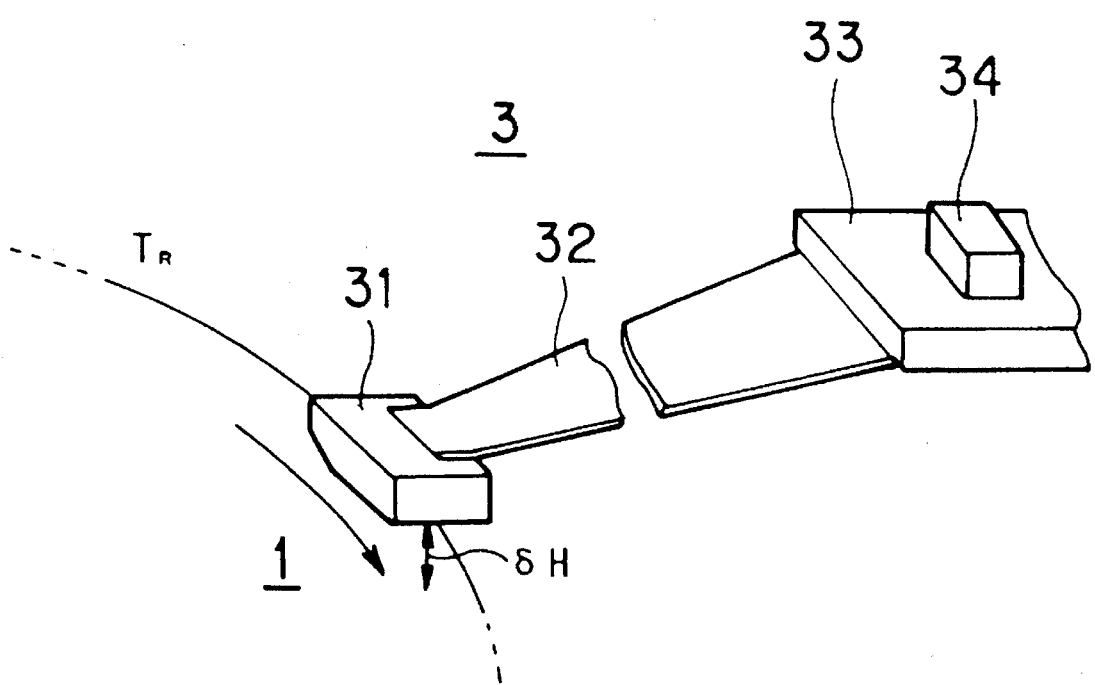
FIG. 4 is a schematic view for explaining the invention disclosed in U.S. Ser. No. 07/977,634 which is abandoned and now is Ser. No. 08/350,034 now U.S. Pat. No. 5,488,857.

FIG. 1 shows output voltage characteristics of a master head unit Hm and a certain measurement head unit Hs, in particular, in which a linear inclined portion shifting from a crest to a trough is highlighted. The abscissa represents the circumferential speed v, the ordinate represents the output voltage e of a head unit 3 and the output voltage characteristics of both head units are respectively designated by em and es. The portions designated by one dot and chain lines respectively represent approximated straight lines Lm and Ls.

The approximated straight lines Lm (linear equation em=−av+b) and Ls (linear equation es=−a'v+b') are obtained from the measured data at the portions shifting from the crest to the trough of the master head unit Hm and the measurement head unit Hs based on the characteristic data of measured output voltage of the master head unit Hm and the measurement head unit Hs while varying the circumferential speed v wherein a and a' represent the inclinations of both straight lines, and b and b' represent crossing points of both straight lines with the output voltage axis (ordinate), namely intercepts at the ordinate, which correspond to theoretical output voltages e of both head units when the circumferential speed is zero.

Further, based on the approximated two straight lines, values b/b' and a'b/ab' can be calculated where the value b/b' represents a ratio of intercepts b and b' on the ordinate. Since the ratio corresponds to a ratio of sensitivity of both head units Hm and Hs, both values can be equalized by controlling the gain of the amplifier for the both head units which amplifies signals from the head units.

Likely, the respective crossing points b/a and b'/a' of both approximated straight lines Lm and Ls with the abscissa (circumferential speed axis) represent intercepts on the abscissa, the ratio a'b/ab' of these values corresponds to a ratio of circumferential speeds vm and vs for both head units Hm and Hs. The point b'/a' can be equalized to the point b/a by varying the circumferential speed at the measurement head unit side.

The ratio b/b' is identified as gain correction coefficient KG and when performing the protrusion inspection using the measurement head unit Hs with this coefficient, gain correction (calibration) for equalizing b' to b is performed with respect to gain Gs of an amplifier 51 set for the master head unit Hm. The ratio a'b/ab' is identified as circumferential speed correction coefficient Ks and when performing protrusion inspection using the measurement head unit Hs with this coefficient circumferential correction (calibration) for equalizing b'/a' to b/a is performed with respect to circumferential speed vs of tracks on a disk for inspection which is set for the master head unit Hm. As a result, the output voltage characteristic of the measurement head units can be substantially matched with that of the master head unit. Further, a variable gain amplifier of which gain is controlled by a control signal from the MPU 8 is used for the amplifier 51.

Figure 5:
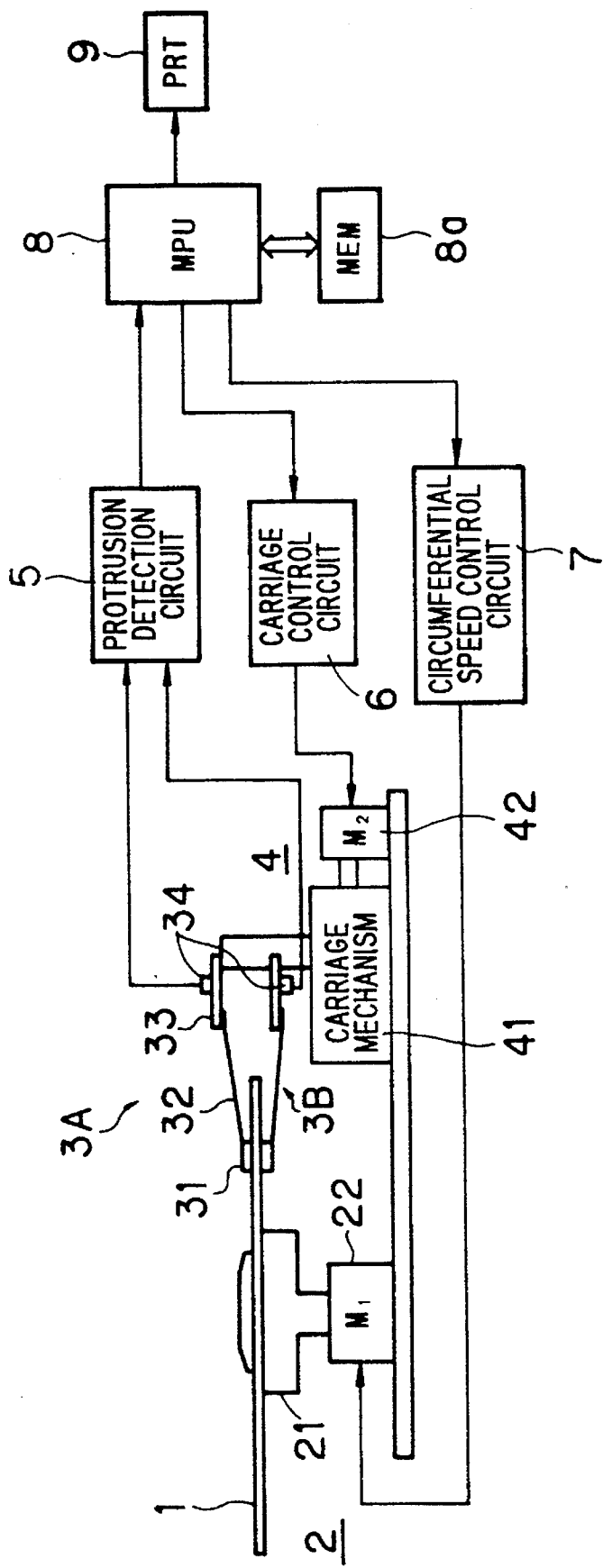
FIG. 5 is a block diagram wherein protrusion inspection head units are provided at both front and back face sides of a disk in a protrusion inspection device to which the invention as shown in FIG. 4 is applied.
Figure 7B:
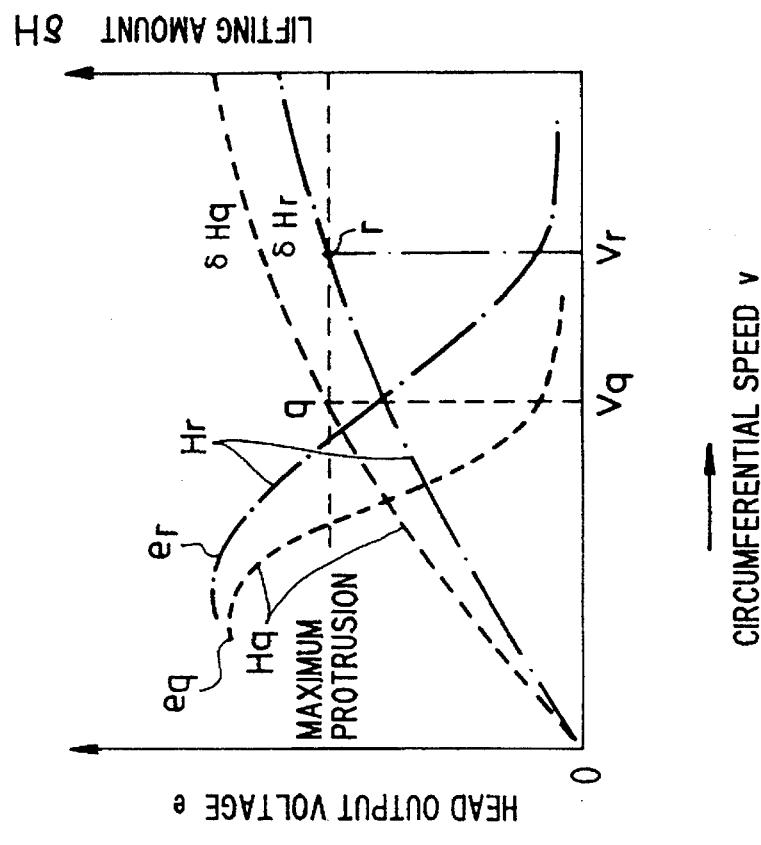
FIG. 7(b) shows characteristic diagrams illustrating dispersion of lifting amount and output voltage with respect to circumferential speed of arbitrarily selected two head units.
Figure 7A:
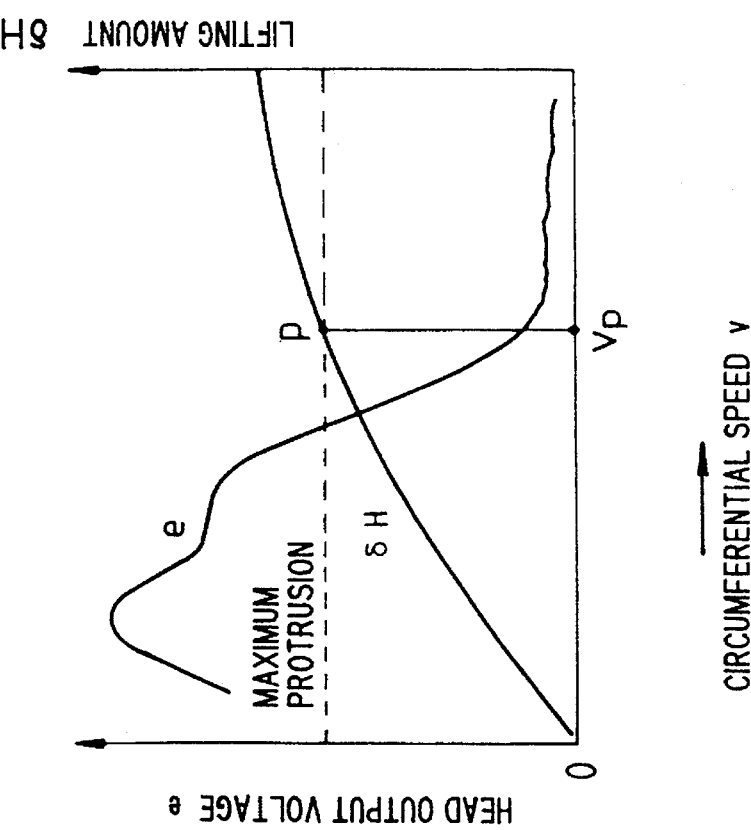
FIG. 7(a) shows characteristic diagrams of lifting amount and output voltage with respect to circumferential speed of a head unit.

The discussion above is the principle of the present invention. In an actual calibration method for head units, at first a head unit of a known lifting characteristic having desirable characteristic as much as possible is selected to be used as a master head unit Hm. An arbitrary head unit used for the protrusion inspection is selected as a measurement head unit Hs. Then a reference disk having a predetermined reference surface roughness produced separately is prepared. After mounting the reference disk on the spindle 21 as shown in FIG. 5, the output voltage characteristics em and es of both head units Hm and Hs are respectively measured while varying the circumferential speed v with the device as shown for example in FIG. 2, which can measure the output voltage (effective value thereof) of the head units wherein the gain of the amplifier is set at a predetermined set value Go. The measurement is performed during the spiral scanning while maintaining the circumferential speed constant to obtain an average value of the effective output voltages. Then a subsequent spiral scanning is performed while varying the circumferential speed by increasing or decreasing the same to obtain another average value of the effective output voltages. These measurements are repeated to obtain output voltages depending upon variation of the circumferential speeds.

Based on the data measured in the portion shifting from the crest to the trough of the obtained output voltage characteristics em and es of both head units Hm and Hs, two straight lines are approximated. From the thus determined straight lines em=−av+b and es=−a'v+b', a gain correction coefficient KG=b/b' and a circumferential correction coefficient KS=a'b/ab' are obtained. These coefficients are provided for the measurement head unit as the correction coefficients for the measurement head unit.

The management of these correction coefficients is performed for every measurement head unit. Further, once the characteristic em=−av+b is obtained for the master head unit, further measurement on the master head unit is unnessessary as long as the reference disk is not replaced.

When the respective head units are managed together with the correction coefficients in the manner explained above, in the case where a certain measurement head unit A performing the protrusion inspection is required to be replaced with another measurement head unit B, since the gain correction coefficient KGA and the circumferential speed correction coefficient KSA of the previous measurement head unit A with respect to the gain GA of the amplifier and the circumferential speed vA at that instant are known such that if the gain correction coefficient KGB and the circumferential correction coefficient KSB of the present measurement head unit B are also known, the gain GB to be set at an amplifier which amplifies the output voltage of the measurement head unit B is determined as follows; GB=GA× KGB/KGA. Further the circumferential speed vB to be set for the track can be determined as follows, vB=vA×KSB/KSA.

When the protrusion inspection is performed under a corrected condition by effecting the gain correction and the circumferential speed correction in the manner as explained above, it is assumed that the output voltage characteristic as shown in FIG. 1 of the head unit Hs used for inspection is calibrated to be substantially equivalent to the output voltage characteristic of the head unit Hm and the output voltage es thereof is shifted substantially to one dot and chain line voltage es' as illustrated which corresponds to the approximated straight line Ls.

Further, when two head units having substantially the same circumferential speed correction value are provided at both front and back face sides of a disk, the simultaneous inspection of front and back face sides can be performed because the gain values for the respective corresponding amplifiers can be set independently. Further, the reference disk having a predetermined surface roughness can be separately produced to prepare the reference surface roughness, however an ordinary disk can be used as a reference disk with no problems.

FIG. 2 shows a protrusion inspection device to which the calibration method according to the present invention is applied, wherein a measurement circuit measuring the output voltage characteristic of the head unit is added to the conventional protrusion inspection device as shown in FIG. 5, and the measurement data of the output voltage (effective value thereof) of the head unit are stored in a memory to calculate the respective correction coefficients so as to permit individual management for every measurement head unit. Further, in the memory 8a as shown in FIG. 5 a gain correction program 80 and a circumferential speed correction and control program 81 are provided. The gain setting of the amplifier 51, which amplifies the signals from the head unit, and the correction of the circumferential speeds of the respective tracks, which are set at the time of protrusion inspection, are designed to be performed automatically. The circumferential speed correction and controlling program 81 is constituted by adding a circumferential speed correcting function to the circumferential speed control program which was explained previously in connection with the conventional art. Further, the carriage control program which was also explained in connection with the conventional art is likely stored in the memory 8a however such is not illustrated.

Still further, in the protrusion inspection device as shown in FIG. 2, illustration of the disk 1, the rotating mechanism 2 for rotating the disk 1 and the carriage portion 4 is omitted because these portions are identical to those shown in FIG. 5. Further, the programs 80 and 81 are called as programs because they respectively use the MPU, however, the actual correction only relates to multiplication and division of correction values to the gain GS and the circumferential speed vs of a master head unit for a protrusion inspection which are stored beforehand in the memory 8a or to the current set values and does not requires a special processing program. Since, a simple numerical calculation processing is satisfactory for the correction, detailed explanation thereof is omitted. Other processing operations belonging to these programs processings include a transmission of control values in response to calculation results from the MPU 8 to the amplifier 51 and the circumferential speed control circuit 7. However, since this merely relates to a general outputting process, explanation thereof is also omitted.

54 is an output voltage measuring circuit which is constituted by an effective value detecting circuit 54a, an A/D conversion circuit (A/D) 54b and a memory 54c. The output of the measurement head unit 34 is amplified at the amplifier 51 and is applied to the effective value detecting circuit 54a via the BPF 52. Further, the gain of the amplifier 51 at this instance is set via control of the MPU 8 so as to be settled at a predetermined gain set value Go during measurement. The effective value detection circuit 54a is constituted by a commutation circuit which commutates collision detection signals and an averaging circuit which samples out the average value of the outputs from the commutation circuit to obtain effective values from the averaging circuit. The effective value (voltage value) detected at the averaging circuit is applied to A/D 54b to be A/D converted. The memory 54c receives the A/D converted values which are successively stored at respective addresses. The A/D 54b performs A/D conversion in response to control signals from the MPU 8 and sends out the conversion result to the memory 54c. The memory 54c renews the addresses in response to the control signals from the MPU 8 and stores the received data. The MPU 8 executes e-v characteristic measurement program 82, provides a control value which maintains the circumferential speed of the respective tracks constant for the circumferential speed control circuit 7, performs the spiral scanning over the entire surface of the disk (which implies here over the range from the outermost track to the innermost track) and at the same time sends out control signals to the A/D 54b and the memory 54c. As a result, measurement data, for when the circumferential speed is kept constant over the entire disk surface, are stored in the memory 54c and the MPU 8 reads out the measured data from the memory 54c and calculates the average value thereof which is then stored in the memory 8a in association with the circumferential speeds provided for the circumferential speed control circuit 7. Subsequently, the above spiral scanning operation is again performed after increasing (or decreasing) the above constant circumferential speed value, then the measured data is read out from the memory 54c and the average value thereof is calculated at the MPU 8 and is stored in the memory 8a in association with the increased or decreased circumferential speed provided for the circumferential speed control circuit 7. Through repetition of these measurements while varying the circumferential speed, a head unit output voltage characteristic e with a function of circumferential speed v is stored in the memory 8a.

Further, in the above embodiment, if the conversion values from the A/D 54b are designed to be received in real time by the MPU 8, the memory 54c is not necessarily required.

The entire operation of the protrusion detection device comprises steps of mounting the master head unit Hm on the carriage portion 4, executing the e-v characteristic measurement program 82 by the MPU 8 and setting the gain of the amplifier 51 at a setting value Go via control of the MPU 8, performing a spiral scanning of the disk under the set gain Go at a constant circumferential speed from the outermost track to the innermost track or vice versa and sampling out effective output voltages of the master head unit using the circumferential speed as the function by repeating the spiral scanning while varying the circumferential speed. Subsequently, the measurement head unit Hs is mounted on the carriage 4 and likely through the control of the MPU 8 the effective output voltage using the circumferential speed as the function under the set gain Go are sampled out by performing the spiral scanning over the entire surface of the disk. As a result the respective measured data em and es are stored in the memory 8a. Then the MPU 8 executes the approximated straight line calculation processing program 83, reads out, among the respective measured data em and es stored in the memory 8a, the measured data in a range relating to a lower circumferential speed than that of vp corresponding to the maximum protrusion, developes these data into data for rectrangular coordinate system of output voltage e-circumferential speed v and determines the respective approximated straight lines Lm and Ls based on data of a plurality of points through a calculation processing (a general linear calculation based on coordinate values).

As a result, linear equations em=-av+b and es=-a'v+b' for the respective approximated straight lines are obtained and are stored in the memory 8a.

Based on this stored data of the respective straight lines, the gain correction coefficient KG=b/b' and the circumferential speed correction coefficient KS=a'b/ab' are determined. These coefficients are stored on a correction value table in the memory 8a as the correction coefficients for the measurement head unit under an identification number assigned for the measurement head unit and inputted beforehand, and further the same measurement is performed for the following measurement head unit and the correction values based on the measurement result are stored on the table 84 under another identification number assigned for the following measurement head unit. When data of the gain correction coefficient KG and the circumferential speed correction coefficient KS for a plurality of measurement head units are obtained, these are stored, for example, in a floppy disk.

When a certain measurement head unit is newly used, the gain correction coefficient KG and the circumferential speed correction coefficient KS of the newly used measurement head unit are read out from the floppy disk and a gain GB of the amplifier 51 and a circumferential speed vB which are to be set for the protrusion inspection device are calculated via the previously explained multiplication and division by making use of the gain GA and the circumferential speed vA and further the gain correction coefficient KG and the circumferential speed correction coefficient KS of the previously used measurement head unit and are than set. Further, as one modification of the above, every time when a measurement head unit is newly mounted, the gain and the circumferential speed therefor which are to be corrected may be calculated by multiplying the correction coefficient KG and the circumferential correction coefficient KS with the reference gain value GS and the reference circumferential speed vs assigned for the master head unit in the course of the protrusion inspection.

Now, when a piezo-electric sensor is used for the head unit 34, the BPF 52 having a band of about 100 KHz–300 KHz is used, and when an ultrasonic sensor is used, the BPF 52 having a band of about 300 KHz–600 KHz is used. Further, since there is dispersion of the specific vibration frequencies of the respective measurement head units, it is preferable to changeover the pass band of the band pass filter (BPF) 52 depending on the dispersion through a control signal from the MPU 8 in response to a command from a keyboard.

In the protrusion inspection device as shown in FIG. 2, every time when a measurement head unit is replaced, calibration of the replaced measurement unit is primarily performed and then the protrusion inspection is performed. Now such processings are explained with reference to FIGS. 3(a) and 3(b).

At first, in the preparation processing as shown in FIG. 3(a), the ouput voltage characteristic em=–av+b of a master head unit which serves as a reference is measured and sampled out, and then stored in the memory 8a.

Namely, a reference disk having a predetermined surface roughness is mounted on the spindle 21 of the inspection device and a master head unit Hm of which lifting amount is known is clamped at the carriage mechanism 41 (step 100). Then the gain of the amplifier is set at Go and the disk 1 is caused to be rotated (step 101). The head unit 34 is moved and loaded onto the reference disk according to the carriage control program, then a spiral scanning is performed at a certain circumferential speed, then the spiral scanning is further performed while varying the certain circumferential speed and through repetition of the spiral scanning the output voltage em with respect to respective circumferential speeds is measured. In this instance, when it is necessary to select a proper band for the BPF 52, the output voltage characteristic em is measured after selecting the band for the BPF 52 via a command to the MPU 8 from the keyboard, and is stored in the memory 8a (step 102). An approximated straight line Lm is calculated based on the measured data and the resultant linear equation em=–av+b is stored in the memory 8a (step 103).

Subsequently, in the case of replacing a measurement head unit during inspection as shown in FIG. 3(b), the reference disk, which was used during the measurement of the characteristic of the master head unit Hm, is mounted on the spindle 21 of the inspection device and a measurement head unit Hs to replace is clamped at the carriage mechanism 41 (step 104).

Then the gain of the amplifier 51 is set at Go and the disk 1 is caused to be rotated (step 105). The head unit 34 is moved and loaded onto the reference disk according to the carriage control program, then output voltage em with respect to respective circumferential speeds is measured while varying the circumferential speed. In this instance, when it is necessary to select a proper band for the BPF 52, the output voltage characteristic es is measured after selecting the band for the BPF 52 via a command to the MPU 8 from the keyboard, and is stored in the memory 8a (step 106). An approximated straight line Ls is calculated based on the measured data and the resultant linear equation es=–a'v+b' is stored in the memory 8a (step 107).

Thereafter, based on the linear equation es=a'v+b' and the linear equation em=–av+b obtained at step 103 the gain correction coefficient KG=b/b' is calculated and then set at the gain correction program 80, likely the circumferential speed correction coefficient KS=a'b/ab' is calculated and set at the circumferential speed correction control program 81 (step 108).

When the inspection is initiated (step 109), through the MPU 8 the gain correction program 80 is executed, the reference gain GS which is assigned for the protrusion inspection with the master head unit Hm is multiplied by the gain correction coefficient KG and the resultant value is set for amplifier 51 as the gain set value (step 110). Further, through the MPU 8 the circumferential speed correction control program 81 is executed, the reference circumferential speed vs, which is assigned for the protrusion inspection with the master head unit Hm, is multiplied by the circumferential speed correction coefficient KS and control values are set at the circumferential control circuit 7 in response to the track to which the head unit is positioned in such a manner that the resultant value of the multiplication determines the circumferential speed of the respective tracks (step 111). Then protrusions on a disk for inspection are inspected with the measurement head unit Hs (step 112).

Through this correction, detection votage es of the measurement head unit is substantially calibrated to the characteristic of the output voltage em of the master head unit and then the protrusion inspection is performed.

When the above calibration method is incorporated into the protrusion detection device, any measurement head units can be used in the protrusion inspection device for performing the protrusion inspection after calibrating the characteristic of the measurement head unit in steps 104–111 of FIG. 3(b) so as to substantially correspond to that of the master head unit. Accordingly, when two head units having substantially the same corrected circumferential speed are selected, provided at both front and back face sides of the disk and the corrected gains corresponding to the respective head units are set and then a simultaneous inspection for the front and back face sides is performed with the head units, a highly reliable inspection result can be obtained.

However, in such instance when the circumferential speed correction coefficient KS exceeds more than two times of the reference circumferential speed, the characteristic of the measurement head unit is decided to be an extreme one in a statistical point of view and the head unit is dealt with as a defective one without subjecting to the calibration. Further a head unit requiring a gain correction of more than 10 times of the reference gain is also dealt with as a defective one.

Further, at step 104, if the reference disk which was used in the measurement for the master head unit is lost, another reference disk can be used. In such instance, the processings in the preparation steps before inspection, in that, from step 100 to step 103 are again traced.

In the embodiment as explained above, the measurement of the effective output voltage of the head unit is performed by a spiral scanning over the entire surface of the disk while keeping the circumferential speed constant, however the range of the spiral scanning can be limited over a plurality of tracks on the disk. Further when there are many protrusions on one track and the height of the protrusions covers over statistically higher one and lower one, the effective value measurement can be terminated after scanning along one track. Still further, other than the spiral scanning, a plurality of tracks can be scanned while stopping at each track to obtain respective effective values of which average value is used as the output voltage of the head unit.

Further, in the above embodiment, head units are provided both for the front and back face sides of the disks. However, in the present invention it is enough if the head unit is provided on at least one of front and back face sides of the disk and the head units are not necessarily required to be provided at both front and back face sides of the disk.

We claim:

1. A calibration method comprising steps of:

determining a linear equation em=−av+b, wherein a is an inclination and b is an intercept on an output voltage axis, after selecting as a master head unit a protrusion detection head unit of which lifting characteristic is known, determining a reference disk having a predetermined surface roughness, loading a head of the master head unit on the face of the reference disk which is rotated and causing to lift the same, measuring output voltages em of the master head unit while varying the circumferential speed of the track on the reference disk to determine as a function output voltage characteristic using the circumferential speed v and linear-approximating the output voltage characteristic on a rectangular coordinate system of output voltage-circumferential speed;

determining a linear equation es=−a'v+b', wherein a' is an inclination and b' is an intercept on the output voltage axis, after selecting an arbitrary protrusion detection head unit which is used for the protrusion inspection as a measurement head unit, loading the head of the measurement head unit on the face of the reference disk and causing to lift the same, measuring output voltages es of the measurement head unit while varying the circumferential speed of the track on the reference disk to determine an output voltage characteristic using the circumferential speed v as the function and linear-approximating the output voltage characteristic on the rectangular coordinate system; further determining b/b' and a'b/ab' based on linear equations em=−av+b and es=−a'v+b', and, correcting the gain of an amplifier, coupled to the measurement head unit, by multiplying the gain by the value b/b' which amplifies the output signal of the measurement head unit when the measurement head unit is to be used for the protrusion inspection and further correcting the circumferential speed of the track on a rotating disk for an inspection object by multiplying the circumferential speed by the value a'b/ab'.

2. A calibration method according to claim 1, wherein the measurement of the output voltage characteristic with respect to variation of the circumferential speed is performed in such a manner that the reference disk is scanned by the measurement head unit over a predetermined track range at a constant circumferential speed to determine an average value of the output voltages of the measurement head unit as an output voltage for the constant circumferential speed and the constant circumferential speed is varied so as to determine other output voltages for respective varied circumferential speeds.

3. A calibration method according to claim 2, wherein the predetermined track range is a range from the innermost track to the outermost track, the scanning is a spiral scanning, the head unit loading face for the reference disk is one of front face and back face thereof, the output voltages of the master head unit and the measurement head unit are inputted to the amplifier respectively and the effective values of the amplified output signals are measured, the gain of the amplifier is set at substantially the same value for the respective measurements, the approximated straight lines are determined based on the portion shifting from a crest to a trough of the output voltage characteristics and, when a previous measurement head unit is replaced with another head unit, the correction of the gain and the circumferential speed is performed via multiplication or multiplication and division of values related to the gain and circumferential speed of the previous measurement head unit used immediately before replacement.

4. A calibration method using a protrusion detection device including an amplifier which amplifies the output of a protrusion detection head unit, a detection circuit which receives a signal from the amplifier and detects collision with protrusions based on the received signal, a spindle on which a disk for inspection is mounted and is rotated thereby and a control unit for controlling the rotation of the spindle, the head of the protrusion detection head unit being loaded on the face of the disk for inspection and then lifted for detecting protrusions, wherein:

the gain of the amplifier is corrected by a gain correction value determined for the protrusion detection head unit and the rotation of the spindle is corrected by a circumferential speed correction value determined for the protrusion detection head unit;

the gain correction value is determined from value b/b' and the circumferential speed correction value from value a'b/ab' based on linear equations em=−av+b and es=−a'v+b' on rectangular coordinate system of output voltage-circumferential speed, wherein em and es are output voltages of the protrusion detection head units, v is circumferential speed, a and a' are inclinations and b and b' are intercepts on output voltage axis;

the linear equation em=−av+b is determined by selecting as a master head unit a protrusion detection head unit of which lifting characteristic is known, determining a disk having a predetermined surface roughness as a reference disk, loading the head of the master head unit on the face of the reference disk which is rotated and causing to lift the same, measuring output voltages em of the master head unit while varying the circumferential speed of the track on the reference disk to determine output voltage characteristic using the circumferential speed v as the function and linear-approximating the output voltage characteristic on the rectangular coordinate system; and the linear equations es=−a'v+b' is determined by selecting the protrusion detection head unit which is used for the protrusion inspection as a measurement head unit, loading the head of the measurement head unit on the face of the reference disk and causing to lift the same, measuring output voltages es of the measurement head unit while varying the circumferential speed of the track on the reference disk to determine as a function output voltage characteristic using the circumferential speed v and linear-approximating the output voltage characteristic on the rectangular coordinate system.

5. A calibration method according to claim 4, wherein the measurement of the output voltage characteristic with respect to variation of the circumferential speed is performed in such a manner that the reference disk is scanned by the measurement head unit over a predetermined track range at a constant circumferential speed to determine an average value of the output voltages of the measurement head unit as an output voltage for the constant circumferential speed and the constant circumferential speed is varied so as to determine other output voltages for respective varied circumferential speeds.

6. A calibration method according to claim 5, wherein the head unit loading face for the reference disk is one of front face and back face thereof, the scanning is a spiral scanning, the predetermined track range is a range from the innermost track, the output voltages of the master head unit and the measurement head unit are the effective values of the output signals from the amplifier, the gain of the amplifier is set at substantially the same value for the respective measurements, the approximated straight lines are determined based on the portion shifting from a crest to a trough of the output voltage characteristics and, when a previous measurement head unit is replaced with another head unit, the correction of the gain and the circumferential speed is performed via multiplication or multiplication and division of values related to the gain and circumferential speed of the previous measurement head unit used immediately before replacement.

7. A protrusion detection device including an amplifier which amplifies the output of a protrusion detection head unit, a detection circuit which receives a signal from the amplifier and detects collision with protrusions based on the received signal, a spindle on which a disk for inspection is mounted and is rotated thereby and a control unit for controlling the rotation of the spindle, the head of the protrusion detection head unit being loaded on the face of the disk for inspection and then lifted by rotating the disk for inspection for detecting protrusions, wherein further including a control circuit having a gain correction coefficient determined for the protrusion detection head unit and a circumferential speed correction coefficient determined for the protrusion detection head unit and the gain of the amplifier is corrected by the gain correction coefficient and the rotation of the spindle is corrected by a circumferential speed correction coefficient;

the gain correction coefficient is determined from value b/b' and the circumferential speed correction coefficient from value a'b/ab' based on linear equations em=−av+b' on rectangular coordinate system of output voltage-circumferential speed, wherein em and es are output voltages of the protrusion head units, v is circumferential speed, a and a' are inclinations and b and b' are intercepts on output voltage axis;

the linear equation em=−av+b is determined by selecting as a master head unit a protrusion detection head unit of which lifting characteristic is known, determining a reference disk having a predetermined surface roughness, loading the head of the master head unit on the face of the reference disk which is rotated causing to lift the same, measuring output voltages em of the master head unit while varying the circumferential speed of the track on the reference disk to determine as a function output voltage characteristic using the circumferential speed v and linear-approximating the output voltage characteristic on the rectangular coordinate system; and the linear equations es=−a'v+b' is determined by selecting the protrusion detection head unit which is used for the protrusion inspection as a measurement head unit, loading the head of the measurement head unit on the face of the reference disk and causing to lift the same, measuring output voltages es of the measurement head unit while varying the circumferential speed of the track on the reference disk to determine as a function output voltage characteristic using the circumferential speed v and linear-approximating the output voltage characteristic on the rectangular coordinate system.

8. A protrusion detection device according to claim 7, wherein said control circuit includes a memory in which the gain correction coefficient, the circumferential speed correction coefficient, the circumferential speed correction coefficient, the gain value of said amplifier and the track circumferential speed value for the master head unit which are to be set at the time of protrusion inspection are respectively stored, and the correction to the gain value is performed by multiplying by the gain correction coefficient and the correction to the circumferential speed value is performed by multiplying by the circumferential speed correction coefficient.

9. A protrusion detection device according to claim 7, wherein the measurement of the output voltage characteristic with respect to variation of the circumferential speed is performed in such a manner that the reference disk is scanned by the measurement head unit over a predetermined track range at a constant circumferential speed to determine an average value of the output voltages of the measurement head unit as an output voltage for the constant circumferential speed and the constant circumferential speed is varied so as to determine other output voltages for respective varied circumferential speeds.

10. A protrusion detection device according to claim 9, wherein the head unit loading face for the reference disk is one of front face and back face thereof, the scanning is a spiral scanning, the predetermined track range is a range from the innermost track and the outermost track, the output voltages of the master head unit and the measurement head unit are measured in a form of the effective values of the amplifier is set at measurements, the approximated straight lines are determined based on the portion shifting from a crest to a trough of the output voltage characteristics and when a previous measurement head is replaced with another head unit, the correction of the gain and the circumferential speed is performed via multiplication or multiplication and division of values related to the gain and circumferential speed of the previous measurement head unit used immediately before replacement.

11. A protrusion inspection device including an amplifier which amplifies the output of a protrusion detection head unit, a detection circuit which receives a signal from the amplifier and detects collision with protrusions based on the received signal, a spindle on which a disk for inspection is mounted and is rotated thereby and a control unit for controlling the rotation of the spindle, the head of the protrusion detection head unit being loaded on the face of the disk for inspection and then lifted by rotating the disk for inspection for detecting protrusions, wherein further including;

an effective value detection circuit which receives and output signal from said amplifier and detects the effective value of the output signal;

an A/D converting circuit which A/D converts the effective value;

a memory; and a calculation processing unit which causes to vary the circumferential speed of tracks on the disk for inspection through control of said control unit, receives outputs from said A/D converting circuit in response to the circumferential speed to store the same in said memory and sets the gain of said amplifier at a predetermined value; and wherein, a linear equation $em=-av+b$ is determined, wherein a is an inclination and b is an intercept on output voltage axis, after mounting a reference disk having a predetermined surface roughness on said spindle, selecting as a master head unit a protrusion detection head unit of which lifting characteristic is known, rotating said reference disk and loading the head of the master head unit on the face of said reference disk and further causing to lift the same, setting the gain of said amplifier at a predetermined value and measuring output voltages em of the master head unit while varying the circumferential speed of the track on the reference disk to determine as a function an output voltage characteristic using the circumferential speed through control of said calculation processing unit and linear-approximating the output voltage characteristic on a rectangular coordinate system of output voltage-circumferential speed, and the linear equation is stored in said memory;

another linear equation $em=-a'v+b'$ is determined, wherein a' is an inclination and b' is an intercept on output voltage axis, after selecting one of said protrusion detection head units which is used for protrusion inspection as a measurement head unit, loading the head of the measurement head unit on the face of the reference disk and causing to lift the same, setting the gain of said amplifier at the predetermined value and measuring output voltages es of the measurement head unit while varying the circumferential speed of the track on the reference disk to determine as a function an output voltage characteristic using the circumferential speed and linear-approximating the output voltage characteristic on the rectangular coordinate system; and values b/b' and a'b/ab' are determined based on the linear equations $em=-av+b$ and $es=-a'v+b'$ and a value which is determined by multiplying a predetermined gain value of the master head unit for a protrusion inspection by the value b/b' is set as the gain for said amplifier and another value which is determined by multiplying a predetermined circumferential speed value of the master head unit for a protrusion inspection by the value a'b/ab' is set as the circumferential speed for the inspection.

12. A protrusion inspection device according to claim 11, wherein the measurement of the effective output voltage characteristic with respect to variation of the circumferential speed is performed in such a manner that the reference disk is spirally scanned by the measurement head unit over a predetermined track range at a constant circumferential speed to determine an average value of the output voltages of the measurement head unit as an output voltage for the constant circumferential speed and the constant circumferential speed is varied so as to determine other output voltages for respective varied circumferential speeds.

13. A protrusion inspection device comprising a protrusion detection head unit of which lifting characteristic is known selected as a master head unit, another protrusion detection head unit which is used for protrusion inspection selected as a measurement head unit, and a reference disk having a predetermined surface roughness, wherein the head of said master head unit and the head of said measurement head unit are successively loaded on the face of said reference disk which is rotated and are caused to be lifted, output voltages em of said master head unit and output voltages es of said measurement head unit are measured while varying the circumferential speed of the track on said reference disk to determine as a function respective output voltage characteristics using the circumferential speed, and the respective output voltage characteristics on a rectangular coordinate system of output voltage-circumferential speed are linear-approximated to determine linear equations of $em=-av+b$ and $es=-a'v+b'$, wherein a and a' are inclinations and b and b' are intercepts on the output voltage axis of the linear equations, further values b/b' and a'b/ab' are determined based on the linear equations of $em=-av+b$ and $es=-a'v+b'$, the gain of an amplifier, coupled to the measurement head unit, is corrected by multiplying the gain by the value b/b' which amplifies the output signal of said measurement head unit when the measurement head unit is to be used for the protrusion inspection and further the circumferential speed of the track on a disk for inspection which is rotated is corrected by multiplying the circumferential speed by the value a'b/ab'.

* * * * *